March 16, 1965  C. A. WENDEL  3,173,985
METHOD OF REFLECTION FOR PRODUCING A PLEASING IMAGE
Filed June 22, 1961  2 Sheets-Sheet 1
Fig. 1
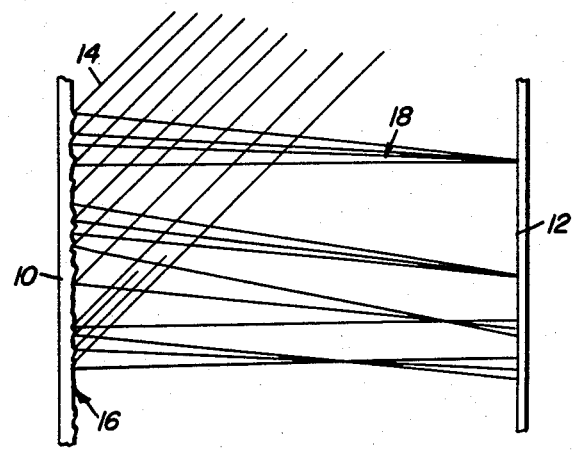
Fig. 2
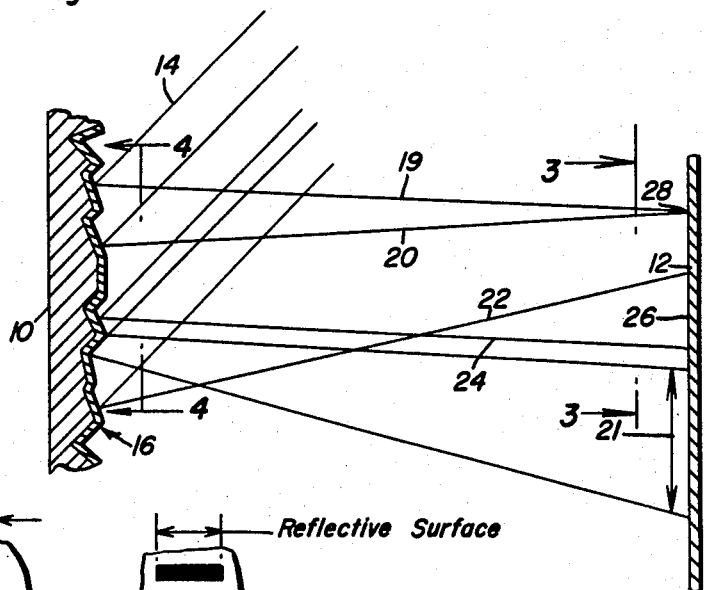
Fig. 3
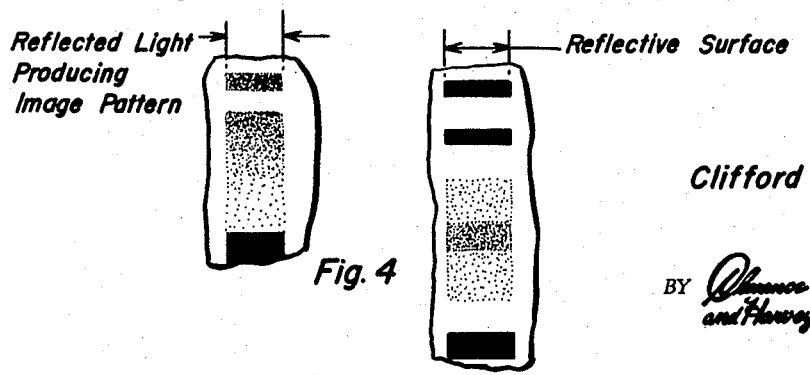
Fig. 4
Clifford A. Wendel
INVENTOR.

March 16, 1965 C. A. WENDEL 3,173,985
METHOD OF REFLECTION FOR PRODUCING A PLEASING IMAGE
Filed June 22, 1961 2 Sheets-Sheet 2
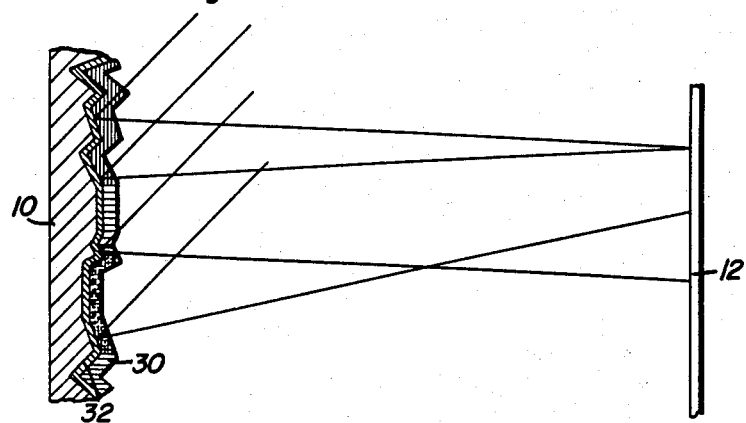
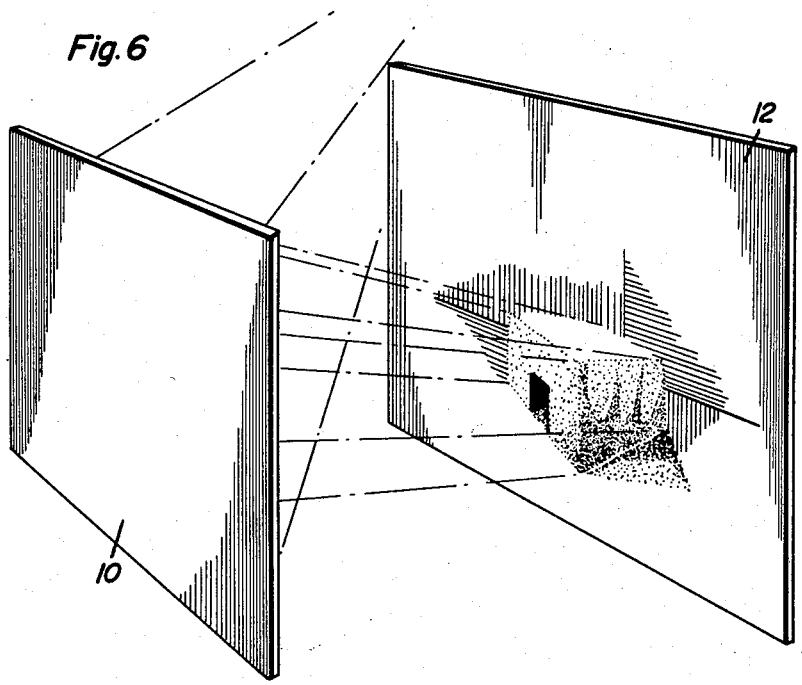
Clifford A. Wendel
INVENTOR.

United States Patent Office 3,173,985
Patented Mar. 16, 1965

3,173,985
METHOD OF REFLECTION FOR PRODUCING A PLEASING IMAGE
Clifford A. Wendel, Libertadores 421, San Isidro, Lima, Peru
Filed June 22, 1961, Ser. No. 118,940
1 Claim. (Cl. 88—75)

This invention relates to an optical device for producing images. More particularly the present invention relates to the production of an image on a screen without any apparent image source or object from which the image is derived.

It is therefore the primary object of the present invention to provide an optical device within which the image itself is created wherein there is no geometric similarity between the image source and the image derived therefrom.

Another object of this invention provides a novel method for creating images or displays as an art form, an advertising medium, for amusement purposes and for concealed image identification purposes.

In accordance with the foregoing objects, the optical device or system of the present invention involves the design of an irregular reflective surface having a random appearing surface pattern from which no image or object is discernible. However, the surface pattern is such that when light from a light source disposed at a predetermined angle to the reflective surface impinges on the reflective surface, a reflected light pattern will be formed on a screen spaced a predetermined distance from the special reflector surface, which reflected light pattern forms an image. The reflected light pattern is therefore produced from a combination of converging and diverging light rays reflected from the special reflective surface. Accordingly, the image so produced appears to arise out of nowhere in view of the fact that the surface pattern on the special reflective surface completely differs from the reflected light pattern or is geometrically dissimilar. Not only is this arrangement particularly suitable as an advertising display because of its dramatic and spectacular nature and not only is it especially adaptable for use by "magicians" for the production of "magical" effects, but because of the unlimited combinations of light intensities, light formed contrasts and textural impression produced on the screen, reflected light images of esthetic value would render the design and shaping of the special reflective surface, a new art form.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 illustrates one light incident plane through the optical system of the present invention.

FIGURE 2 is an enlarged sectional view of a portion of the optical system illustrated in FIGURE 1.

FIGURE 3 illustrates a portion of a reflected light pattern produced on the screen of the optical system as viewed from section line 3—3 of FIGURE 2.

FIGURE 4 illustrates a portion of the reflective surface pattern as viewed from a plane indicated by section line 4—4 in FIGURE 2.

FIGURE 5 illustrates modification of the optical system of FIGURE 2.

FIGURE 6 is a perspective view of the optical system producing a reflected light image pattern.

Referring now to the drawings in detail, FIGURE 1 illustrates the basic optical system of the present invention which includes the special reflector 10 spaced at a predetermined distance from a reflected light receiving screen 12 on which the image pattern is produced. Light from a source disposed at a predetermined angle to the reflector 10 as indicated by the incident light rays 14 impinges upon the reflective surface generally referred to by reference numeral 16 so as to cause the reflecting light rays generally referred to by reference numeral 18 to be received on the screen 12.

The reflector 10 is of special design in that reflector surface 16 has an irregular surface pattern from which no image or object is discernible when directly viewing the reflective surface. The reflective surface will accordingly contain surface portions of different curvatures and surface irregularities in many different planes so that the impinging incident light rays 14 as more clearly seen from FIGURE 2 will be reflected from the reflective surface 16 at different angles and with different dispersion characteristics. For example, those regions on the reflector surface 16 which are in planes parallel to the incident light rays 14 do not reflect light onto the screen so as to form dark spaces 21. Other surface portions of the reflective surface 16 disposed at some angle to the incident light ray 14 will however reflect light therefrom for impingement upon the screen 12. Polished plane surfaces will produce smooth textural impressions while non-polished surface portions will produce different light dispersions.

It will therefore be appreciated, that the reflective surface may be so designed as to reflect light rays at different angles and to different extents causing concentration of light rays on certain portions of the screen 12 such as indicated by reflected light rays 19 and 20 in FIGURE 2, and diverging light rays 22 and 24 producing a hazy light portion 26 on the screen 12. It will also be apparent, that other reflected light rays will impinge on the screen 12 in converging relation. The angle of incidence of the light rays 14 with respect to the general plane of the reflector 10 and the spacing between the reflector 10 and the screen 12 will therefore determine the actual reflected light pattern produced on the screen 12. This light pattern will be composed of varying degrees of high light, contrasts and haziness by virtue of the converging, diverging and concentrating light rays that impinge upon the screen. Accordingly, the reflected light pattern on the screen 12 will be radically different from the surface pattern of the reflective surface 16. Referring therefore to FIGURE 3, it will be seen that a reflected light pattern displaying shading effects may be produced on the screen 12 from a reflective surface pattern illustrated in FIGURE 4 giving the viewer an entirely misleading impression as to the reflected light pattern produced therefrom. For example, contrasting light portions closely spaced from each other on the screen 12 may be produced from surface portions on the reflector 10 which are widely and misleadingly spaced from each other. It will however be appreciated, that the reflective surface 16 must be designed for a predetermined angular disposition of the light source from which the light rays 14 emanate and for a predetermined distance from the screen on which the image is to be produced. The image may then be formed by use of an unlimited combination of light shading. Furthermore, a variation in the image texture impression may be provided by the use of different reflective materials and by variation in light dispersion qualities of the reflective materials.

Having once designed the special reflector 10, the image created therefrom can only be reproduced when the relative spacing between the reflector 10 and the screen 12 and the angular orientation of the reflector with respect to the light source is reproduced. This may obviously be accomplished in any suitable manner. The image may therefore be produced only when such conditions of screen spacing and light source direction prevail so that the special reflector may constitute convenient concealed image identification that may be placed on rings, plaques, disks, etc. Also, the special reflector 10 may form the source of spectacular and dramatic magical tricks as well as an advertising display.

As more clearly seen in FIGURE 6, an image formed by the reflected light pattern is produced on the screen 12 from the reflector 10 when spaced from the screen 12 and arranged at the aforementioned predetermined angle to the light source. The image so produced may be formed from light or absence of light on the screen 12 producing contrasts, variable shading and different texture impressions. Accordingly, the teaching of the present invention may constitute the basis of a new art form through which esthetically pleasing effects may be created by artistic and discreet use of reflected light.

The unlimited application of the teachings of the present invention will become more apparent by introducing color. Referring therefore to FIGURE 5, it will be observed that the reflector 10 may be coated on its reflective surface, with a multi-colored layer 30 which is transparent and composed of different color portions so that the light reflected therethrough will also create a color pattern in addition to the variable light intensity pattern through which the image is produced. As an alternative procedure for introducing color, the reflective material 32 itself may be formed by different colored materials such as copper, silver and colored aluminum in which case the layer 30 is eliminated.

From the foregoing description, the use and application of the present invention will be apparent. While the description of FIGURES 1 through 5 referred to the difference in the reflective surface pattern of the reflector 10 and the reflected light pattern on the screen 12 in one incident plane, it will be appreciated that the irregular reflective surface of the reflector 10 may extend in all directions so that the irregular pattern of the reflector surface may also differ in a direction perpendicular to the plane of the paper on which FIGURES 1 through 5 are depicted. A greater variation in the reflected light patterns is thereby made possible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A method for producing a pleasing image on a screen using a reflector having a plurality of angularly different reflective surfaces displaying a random surface pattern and a source of collimated light comprising the steps of: positioning the reflector relative to a collimated source of light and a screen; adjusting the angular relationship of the reflector to the source of collimated light and adjusting the spatial relationship of the reflector to the screen necessary to reflectively create a desired image on the screen which is geometrically dissimilar from said random surface pattern of the reflector when directly viewed; determining said particular angular and spatial relationships under which the image is created with said reflector; and reestablishing said particular determined relationships of the reflector to a source of collimated light and a screen in order to recreate said image on the screen when desired.

References Cited by the Examiner
UNITED STATES PATENTS

| | | | |
|---|---|---|---|
| 1,791,994 | 2/31 | Altenburg | 88—1 |
| 1,888,377 | 11/32 | Eschenbach. | |
| 2,043,690 | 6/36 | Arbuckle et al. | 40—130 |

JEWELL H. PEDERSEN, *Primary Examiner.*

WILLIAM MISIEK, *Examiner.*